| (12) | United States Patent | (10) Patent No.: | US 11,725,766 B2 |
|---|---|---|---|
| | Merritt et al. | (45) Date of Patent: | Aug. 15, 2023 |

(54) SYSTEMS AND METHODS FOR REPAIRING PIPING

(71) Applicants: Dany Merritt, Montgomery, TX (US); Hank Taylor, Houston, TX (US)

(72) Inventors: Dany Merritt, Montgomery, TX (US); Hank Taylor, Houston, TX (US)

(73) Assignee: Epoxy Design Systems, Inc., Houston, TX (US)

( * ) Notice: Subject to any disclaimer, the term of this patent is extended or adjusted under 35 U.S.C. 154(b) by 0 days.

(21) Appl. No.: 17/092,776

(22) Filed: Nov. 9, 2020

(65) Prior Publication Data

US 2022/0146037 A1 May 12, 2022

(51) Int. Cl.
*F16L 55/175* (2006.01)
*F16L 55/17* (2006.01)
*F16L 55/168* (2006.01)

(52) U.S. Cl.
CPC ............ *F16L 55/175* (2013.01); *F16L 55/17* (2013.01); *F16L 55/1686* (2013.01)

(58) Field of Classification Search
CPC .. B29C 44/1295; F16L 55/1686; F16L 55/17; F16L 55/175; F16L 55/178; F16L 59/10; F16L 59/165; F16L 59/181; F16L 59/182
USPC .................................. 138/97, 98, 99; 285/15
See application file for complete search history.

(56) References Cited

U.S. PATENT DOCUMENTS

| 3,563,276 | A | * | 2/1971 | Hight | .................. F16L 55/1686 285/915 |
|---|---|---|---|---|---|
| 3,847,722 | A | * | 11/1974 | Kistner | .................... B32B 27/12 428/128 |
| 4,323,526 | A | * | 4/1982 | Hilbush, III | ...... B29C 66/52298 264/328.13 |
| 4,756,337 | A | * | 7/1988 | Settineri | ............. F16L 55/1686 156/49 |
| 4,880,035 | A | * | 11/1989 | Vetter | ................. F16L 55/1683 138/97 |
| 5,413,385 | A | * | 5/1995 | Hilbush, III | .......... F16L 55/175 405/184.5 |
| 6,217,688 | B1 | * | 4/2001 | Landers | .................. F16L 55/18 264/36.16 |
| 6,386,236 | B1 | * | 5/2002 | Buckley | ................ F16L 55/175 138/97 |
| 2006/0272724 | A1 | * | 12/2006 | Borland | .............. F16L 55/1686 138/172 |

(Continued)

*Primary Examiner* — Robert K Arundale
*Assistant Examiner* — Richard K. Durden
(74) *Attorney, Agent, or Firm* — Chamberlain, Hrdlicka, White, Williams, & Aughtry (57) ABSTRACT

A method for sealing a liquid leak in a pipe. The method may include wrapping a circumference of the pipe with a gasket material at a location of the leak to create an annular cavity between the gasket material and the pipe. The method may also include allowing the leaking liquid to exit from the annular cavity. The method may further include securing the gasket material to the pipe. The method may also include injecting an expandable grout into the annular cavity between the pipe and the gasket material. The method may further include allowing the grout to expand upon contact with the leaking liquid to create a seal around the leak. The method may also include adhering a reinforcement material to the gasket material and the pipe to reinforce the gasket material and the pipe at the location of the leak.

7 Claims, 7 Drawing Sheets

(56) References Cited

U.S. PATENT DOCUMENTS

| | | | | |
|---|---|---|---|---|
| 2010/0154913 A1* | 6/2010 | Brooks | ................. | F16L 55/175 |
| | | | | 138/97 |
| 2012/0223452 A1* | 9/2012 | Tailor | ..................... | F16L 47/22 |
| | | | | 264/46.9 |
| 2013/0112310 A1* | 5/2013 | Williams | .............. | F16L 55/175 |
| | | | | 138/172 |
| 2015/0204475 A1* | 7/2015 | Brooks | ............... | F16L 55/1686 |
| | | | | 138/99 |
| 2018/0266613 A1* | 9/2018 | Walker | ................. | F16L 55/175 |

\* cited by examiner

SYSTEMS AND METHODS FOR REPAIRING PIPING

BACKGROUND

This section is intended to provide relevant background information to facilitate a better understanding of the various aspects of the described embodiments. Accordingly, it should be understood that these statements are to be read in this light and not as admissions of prior art.

Industrial facilities, such as refineries, power plants, and manufacturing plants, as well as municipalities, utilize many sizes and types of pipe throughout the facilities to transport various liquids that are under pressure and at varying temperatures from one location to another. Over time the pipe and joints between sections of pipes can fail and develop leaks.

For some leaks, seal tape may be used to repair the pipes. However, liquids often contained with tape may leak through seal tape over time and the leaking or cracked pipe must eventually be replaced. Further, seal tape does not address any loss of structural strength in the pipe. Thus, seal tape is not typically used on large diameter pipes, e.g., 12 inches (30.5 cm) to 72 inches (182.9 cm).

The repair of large diameter pipes typically requires replacing at least a section of the pipe, causing the industrial facility to shut down while the pipe is repaired. The leaking pipe section can then be removed and replaced with new sections of pipe. However, shutting down even a portion of an industrial facility can be very costly, as the facility would, at best, be operating at a reduced capacity if not completely shut down, and incurring a loss of revenue until the pipe is repaired.

BRIEF DESCRIPTION OF THE DRAWINGS

Embodiments of the systems and methods for repairing piping are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes systems, methods, and kits for repairing piping. The systems and methods provide an alternative to and time-consuming replacement of pipes that transport liquid that result in a loss of revenue. Additionally, the systems, methods, and kits can be used to repair any size piping that transports liquid, including large diameter pipes.

Figure 1:
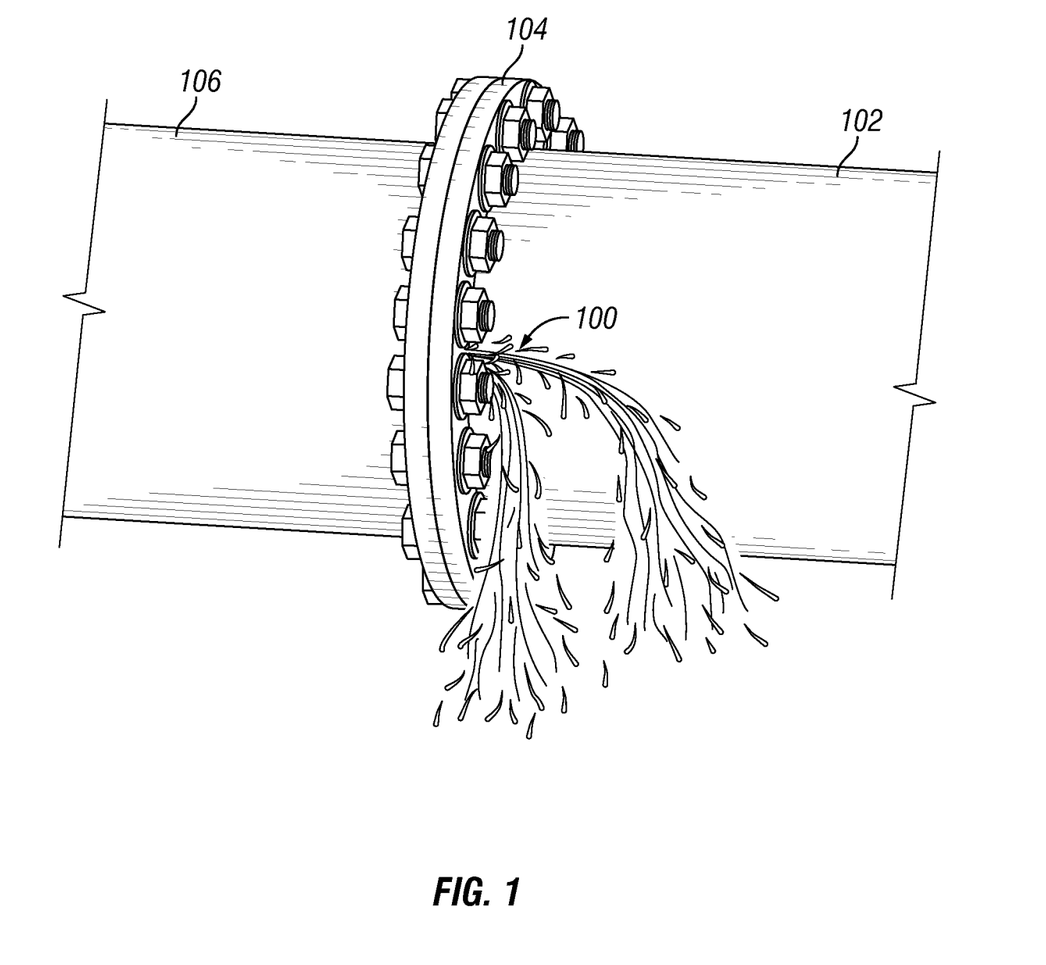
FIG. 1 is a side view of a leak in a first pipe near a flange connection with a second pipe, according to one or more embodiments.

FIG. 1 is a side view of a leak 100 in a pipe 102 near a flange connection 104 with a second pipe 106, according to one or more embodiments. As shown, a liquid is leaking from a connection between the pipe 102 and the flange connection 104. However, the present disclosure is not thereby limited. The systems and methods described below may be used to repair any type of liquid leak in a pipe 102 at any location in a piping system, including, but not limited to, a leak in a straight section of pipe 102, a leak in a bend of a pipe 102, a leak at a welded bend or elbow coupled to a pipe 102, a leak at a welded or bolted connection between two sections of pipe 102, or a leak at an expansion joint between two sections of pipe 102.

In order to repair the leak 100 in the pipe 102, the pipe 102 and the surrounding area are prepared for the repair operations. A containment area (not shown) is set up in the area surrounding the leak 100 to prevent the liquid leaking from the pipe 102 from entering the surrounding environment. However, this step may be omitted for some liquids that are not harmful to the environment, such as water used in a cooling tower. In some situations, existing pipe supports (not shown) may be removed, repaired, or replaced and new supports (not shown) may be installed to allow access to the location of the leak 100 in the pipe 102. Additionally, the surface of the pipe 102 around the area of the leak is cleaned and any rust or other debris that might interfere with the repair is removed.

Figure 2:
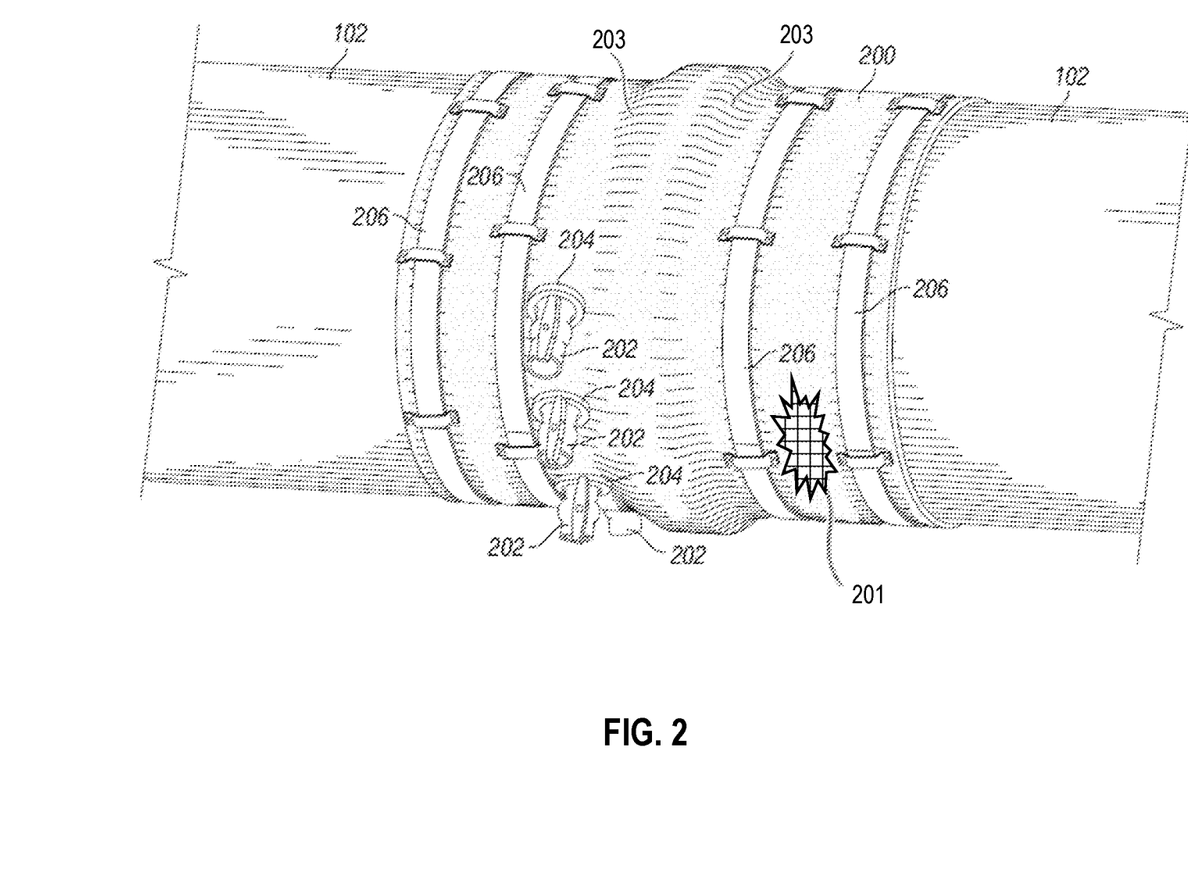
FIG. 2 is a side view of the pipe of FIG. 1 with gasket material wrapped around the pipe.

As shown in FIG. 2, once the pipe 102 and surrounding area are prepared, a gasket material 200 made of a flexible, non-permeable material is wrapped circumferentially around the pipe 102 at the location of the leak 100. In at least one embodiment, the gasket material 200 is a rubber material. In other embodiments, the gasket material 200 is a rubber material with an internal structural mesh 201 (shown as a cutaway) that reinforces and adds additional strength to the rubber material. The gasket material 200 also includes one or more bypass valves 202 installed in ports 204 in the gasket material 200 via nuts (not shown) on either side of the gasket material to control the flow of liquid out of the ports 204. The bypass valves 202 allow liquid leaking from the pipe 102 to flow through the gasket material 200 at predetermined locations as the gasket material 200 is installed around the pipe. In the illustrated embodiment, four bypass valves 202 are installed around the leak area and the bottom of the pipe 102. However, the exact number and location of bypass valves 202 may vary based on the location of the leak 100, the size of the pipe 102, and the amount of liquid leaking from the pipe 102. Additionally, shims 203, e.g., strips of rubber or a similar flexible material, may be installed between the gasket material 200 and the pipe 102 to create an annular cavity between the gasket material 200 and the pipe 102.

Once the gasket material 200 is wrapped around the pipe 102, tie-down straps, such as ratchet straps, are used to secure the gasket material 200 to the pipe 102. In some embodiments, steel bands 206 are then installed circumferentially around the gasket material 200 to more permanently secure the gasket material 200 to the pipe 102. Once the steel bands 206 are in place, the tie-down straps may be removed or remain in position.

Once the gasket material 200 is secured around the pipe 102, an expandable grout is injected under controlled pressure into the annular cavity between the pipe 102 and the gasket material 200. The expandable grout reacts with the leaking liquid to expand and displace the liquid leaking from the pipe 102. Injection of the expandable grout into the gasket material 200 is continued or repeated until there is no more liquid leaking from the pipe 102. The expandable grout can be injected through any port or ports 204 in the gasket material 200. New ports 204 may also be created to inject the expandable grout into a specific location in the annular cavity between the gasket material 200 and the pipe 102 to spot seal any leaking liquid. The composition of the expandable grout varies depending on the temperature and chemical composition of the liquid leaking from the pipe such that the expandable grout reacts with the liquid leaking from the pipe 102 and expands. The expandable grout expands upon contact with the leaking liquid and then cures to become impermeable to the liquid leaking from the pipe 102, sealing the leak in the pipe 102.

Figure 3:
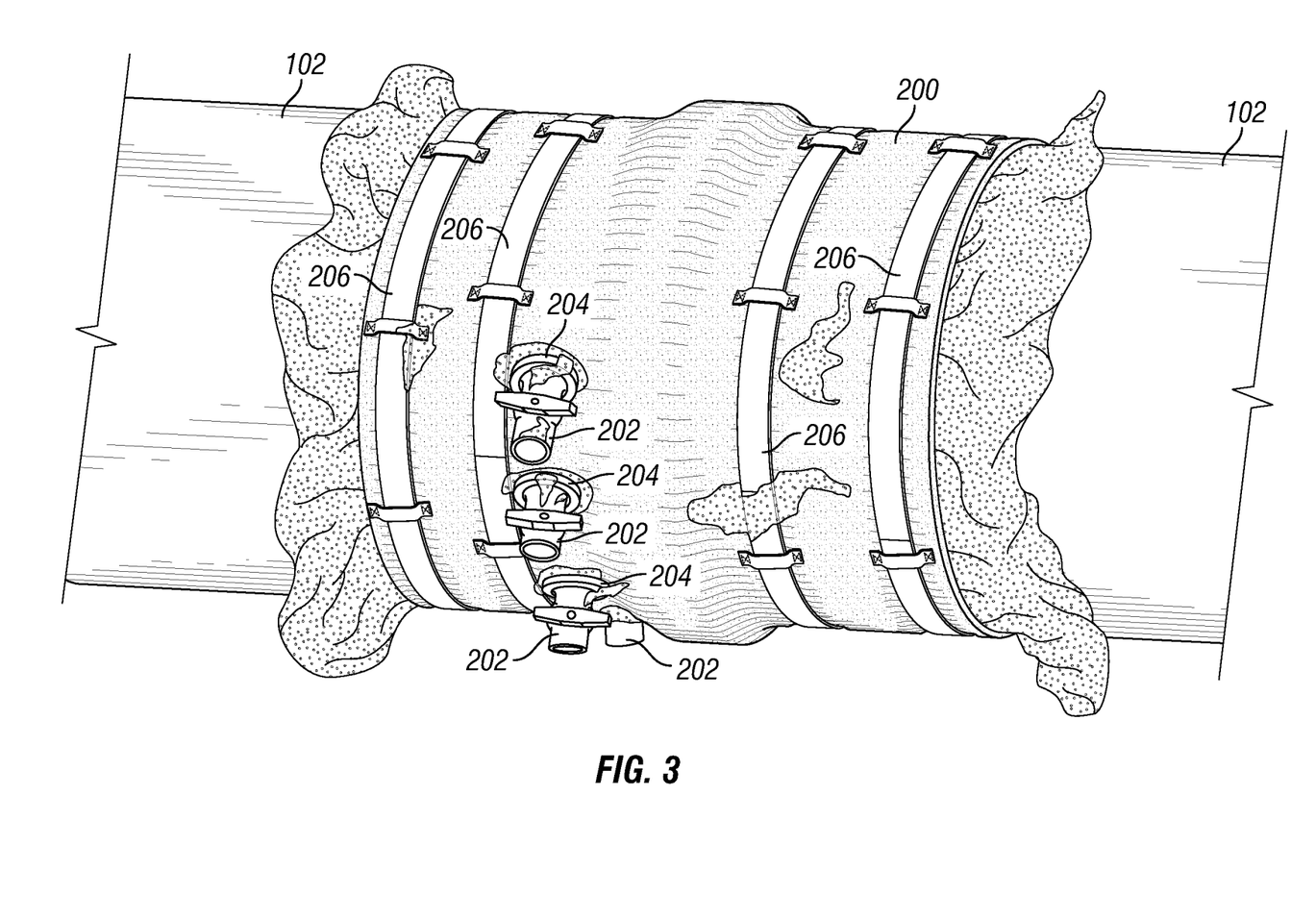
FIG. 3 is a side view of the pipe of FIG. 2 once the expandable foam has been injected, according to one or more embodiments.

As shown in FIG. 3, once the expandable grout cures, the leak 100 in the pipe 102 has been sealed. Once sealed, the bypass valves 202 are removed and any excess expanded grout is trimmed to allow for the pipe 102 and gasket material 200 to be wrapped as described below. Additional steel bands 206 may also be installed around the gasket material 200 to more permanently secure the gasket material 200 to the pipe 102 and the tie-down straps may be removed if desired to reduce the final profile of the repaired pipe.

Figure 4:
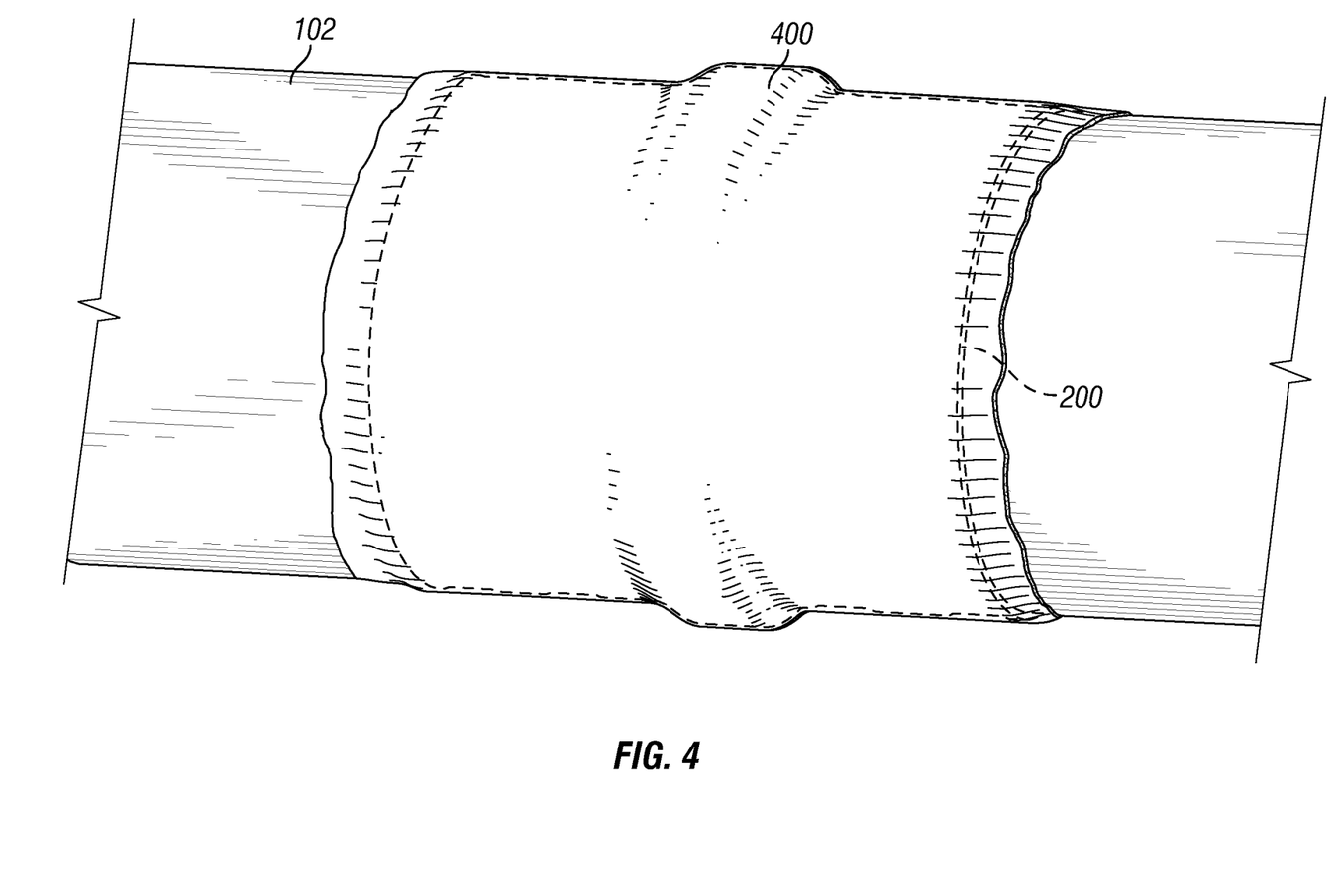
FIG. 4 is a side view of the pipe of FIG. 3 with a mesh screen applied over the gasket material.

As shown in FIG. 4, a mesh 400 is then wrapped circumferentially around the pipe 102 and the gasket material 200.

Figure 5:
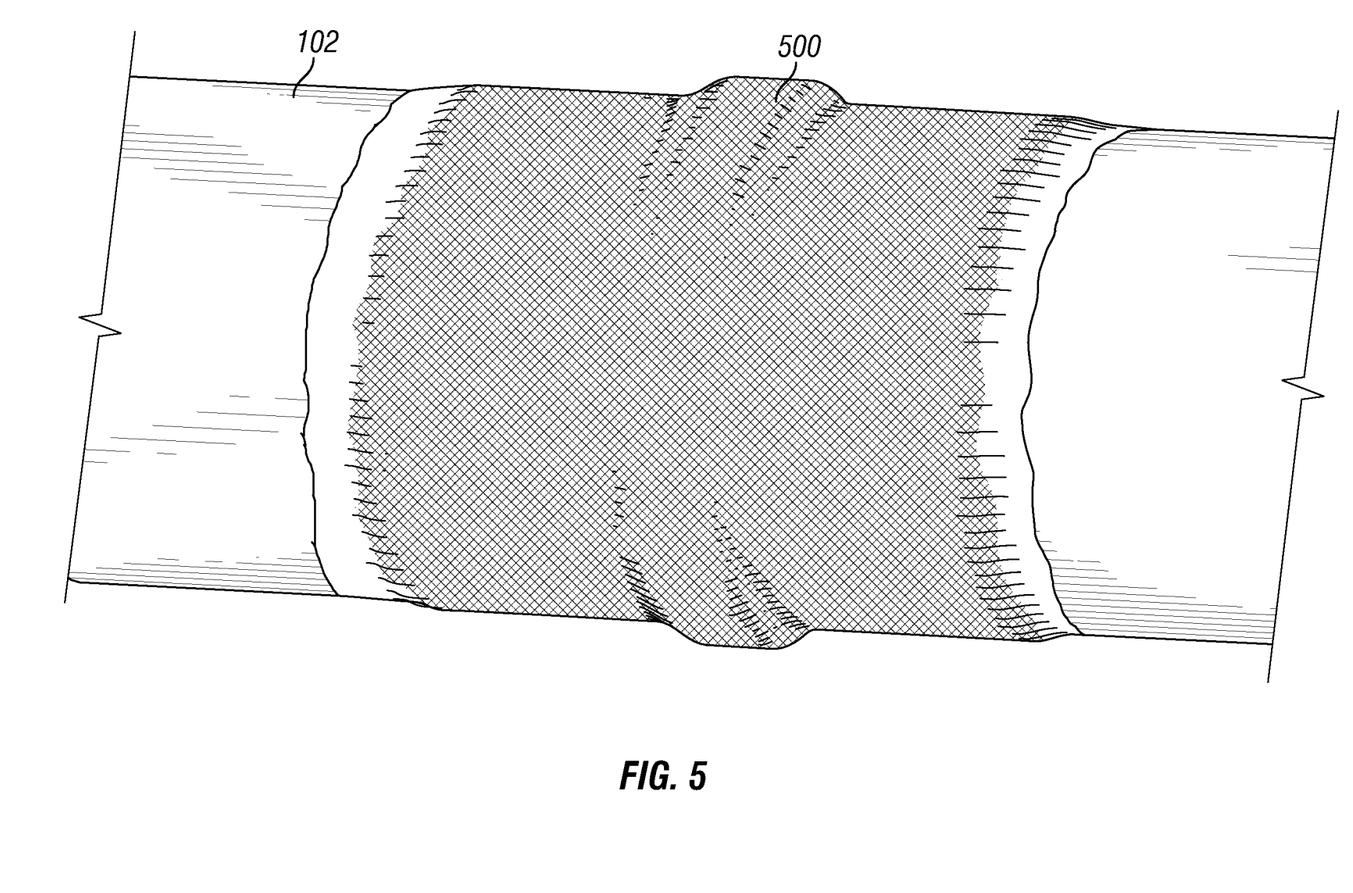
FIG. 5 is a side view of the pipe of FIG. 4 with an epoxy applied to the mesh screen.

As shown in FIG. 5, once the mesh 400 is installed, the mesh 400 and the pipe 102 to either side of the mesh are coated in an epoxy paste 500. The epoxy paste 500 smooths any sharp edges caused by the gasket material 200, tie-down straps or steel bands 206, or other pipe features, such as a flange connection 104 or welded pipe fittings (not shown), to aid in the application of reinforcement material. In some embodiments, a second, thinner layer of epoxy paste is applied to the initial layer of epoxy paste 500 to help the reinforcement material adhere to the initial layer of epoxy paste 500. In other embodiments, the second layer of epoxy paste is omitted.

Figure 6:
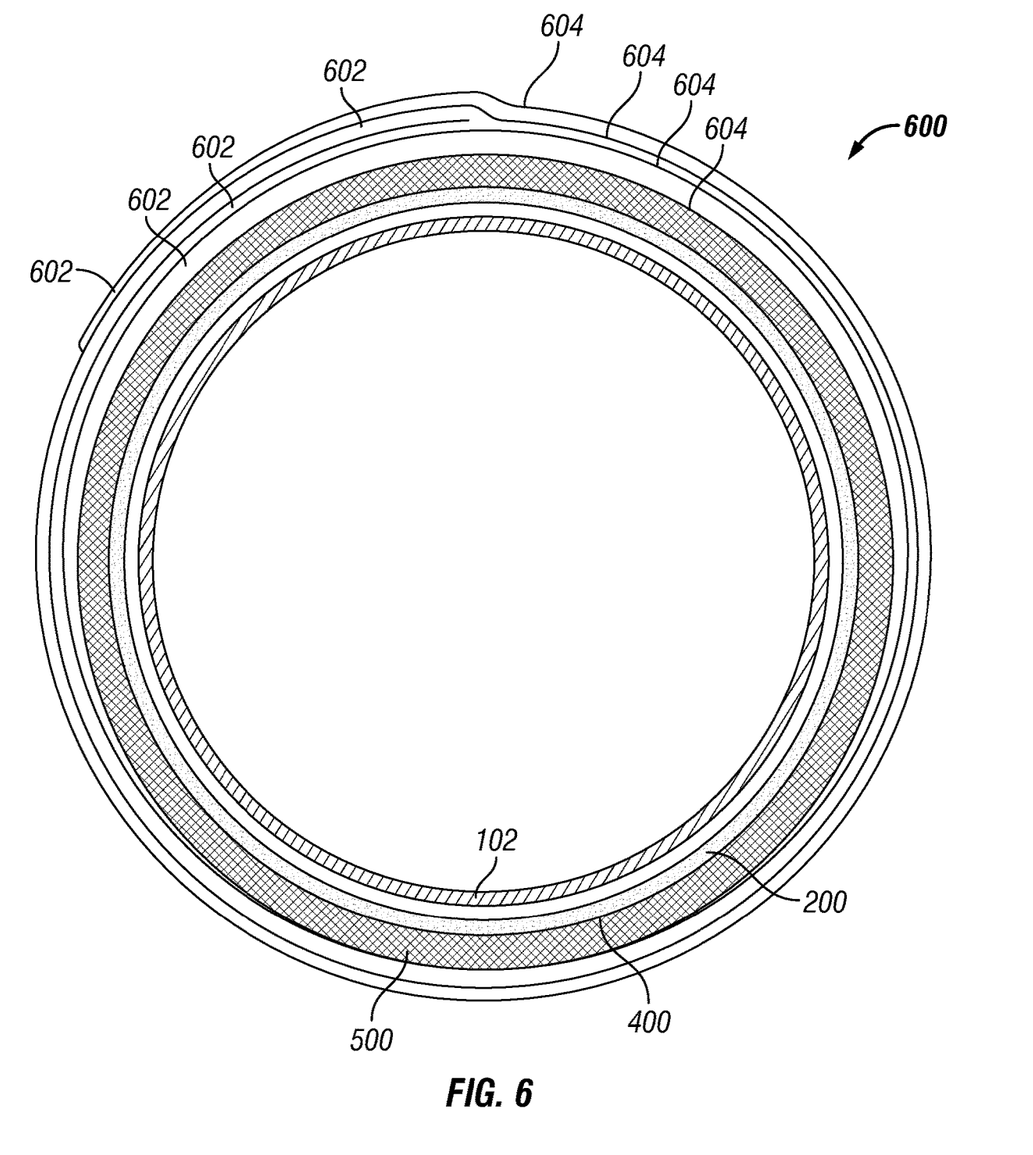
FIG. 6 is a section view of the pipe of FIG. 5 with carbon fiber applied to the epoxy.

As shown in FIG. 6, after the epoxy paste 500 cures, a reinforcement material 600, such as fiber reinforced polymer or a carbon fiber system including alternating layers of epoxy 602 and carbon fiber 604, is applied to the cured epoxy paste 500 and around the pipe 102 between 1 foot and 1.5 feet beyond the gasket material on both sides to increase the structural strength of the pipe 102 at the location of the leak 100. Each layer of carbon fiber 604 may be axially aligned with the pipe 102, wrapped around the circumference of the pipe 102, or applied at a 45° angle with respect to the longitudinal axis of the pipe 102. The exact number of layers of carbon fiber 604 alignment of each layer of carbon fiber 604 is determined by an engineer based on the requirements for reinforcing the structural integrity of the pipe 102 being repaired.

Figure 7:
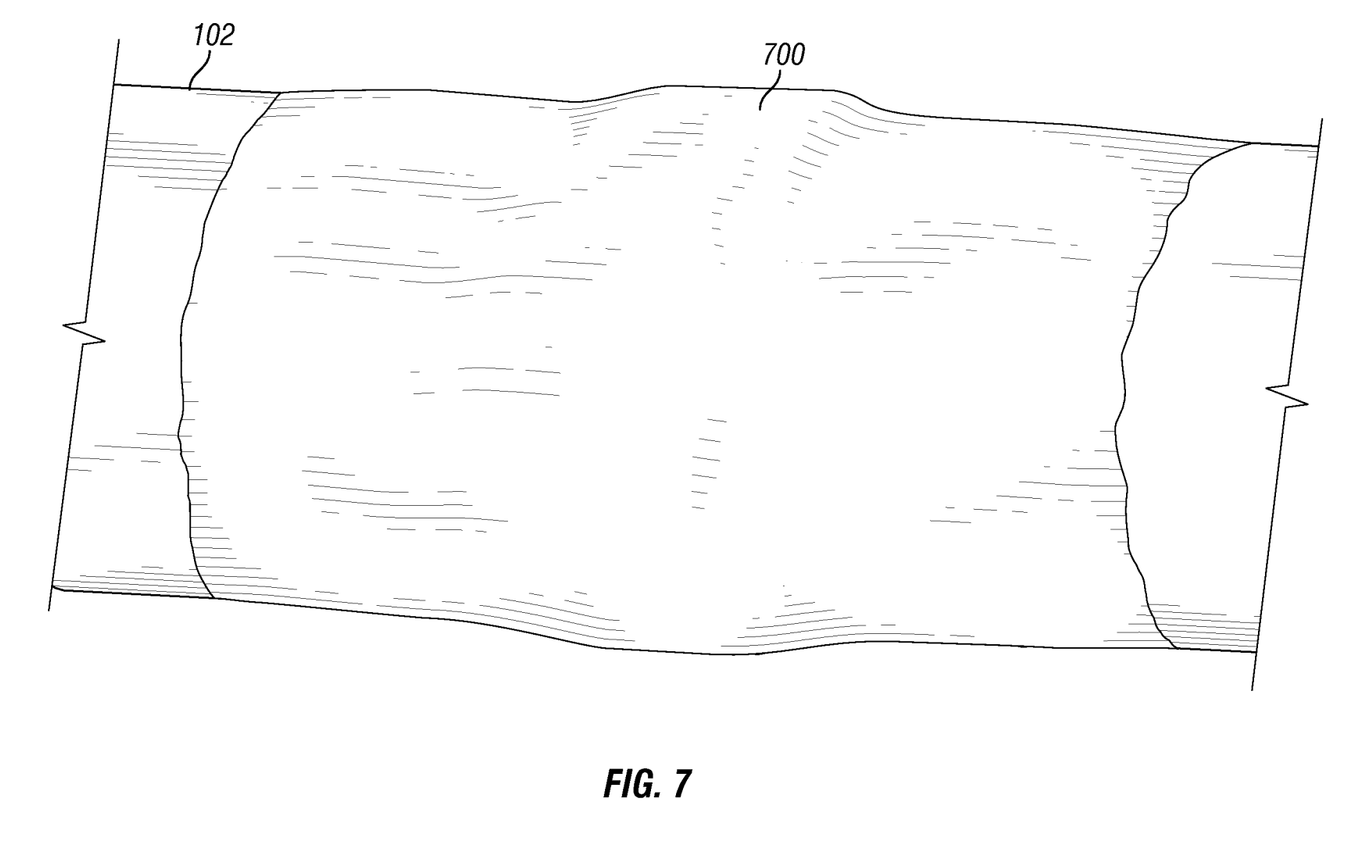
FIG. 7 is the pipe of FIG. 6 once the repair is complete.

As shown in FIG. 7, once the layers of epoxy 602 and carbon fiber 604 cure, the repaired section 700 of the pipe 102 will have a reinforced structural strength compared to when the pipe 102 was leaking. The repaired section 700 of the pipe may also be reinforced to have at least the same structural strength as the pipe 102 when it was initially installed. The repaired section 700 of the pipe may also be reinforced to have a greater structural strength than the pipe 102 when it was initially installed. Additionally, the reinforcement material 600 will further smooth the transition between the repaired section 700 and the rest of the pipe 102.

Further examples include:

Example 1 is method for sealing liquid leaking from a pipe. The method includes wrapping a circumference of the pipe with a gasket material at a location of the leak to create an annular cavity between the gasket material and the pipe. The method also includes allowing the leaking liquid to exit from the annular cavity. The method further includes securing the gasket material to the pipe. The method also includes injecting an expandable grout into the annular cavity between the pipe and the gasket material. The method further includes allowing the grout to expand upon contact with the leaking liquid to create a seal around the leak. The method also includes adhering a reinforcement material to the gasket material and the pipe to reinforce the gasket material and the pipe at the location of the leak.

In Example 2, the examples of any preceding paragraph or combination thereof further include wherein wrapping the pipe with the gasket material includes installing shims between the gasket material and the pipe to create the annular cavity.

In Example 3, the examples of any preceding paragraph or combination thereof further include wherein allowing leaking liquid to exit from the annular cavity includes allowing leaking liquid to exit from the annular cavity through a valve in the gasket material.

In Example 4, the examples of any preceding paragraph or combination thereof further include removing the valve from the gasket material after the grout has expanded.

In Example 5, the examples of any preceding paragraph or combination thereof further include installing straps and/or steel bands around the gasket material prior to adhering the reinforcement material.

In Example 6, the examples of any preceding paragraph or combination thereof further include wrapping a mesh screen around a circumference of gasket material prior to adhering the reinforcement material.

In Example 7, the examples of any preceding paragraph or combination thereof further include coating the mesh screen with epoxy paste prior to adhering the reinforcement material.

In Example 8, the examples of any preceding paragraph or combination thereof further include coating the gasket material and the pipe further includes coating the pipe between 1 foot and 1.5 feet beyond the gasket material on both sides.

In Example 9, the examples of any preceding paragraph or combination thereof further include wherein the gasket material includes rubber.

In Example 10, the examples of any preceding paragraph or combination thereof further include wherein the gasket material further includes a structural mesh.

Example 11 is a system for sealing a liquid leaking from a pipe. The system includes a gasket material, straps and/or steel bands, an expanded grout, and a reinforcement material. The gasket material is wrapped circumferentially around the pipe at a location of the leak. The straps and/or steel bands are positioned to secure the gasket material to the pipe. The expanded grout is disposed with an annular cavity formed between the gasket material and the pipe that seals the leak in the pipe. The reinforcement material is adhered to the gasket material and the pipe to reinforce the pipe at the location of the leak.

In Example 12, the examples of any preceding paragraph or combination thereof further include shims installed between the gasket material and the pipe to create the annular cavity.

In Example 13, the examples of any preceding paragraph or combination thereof further include wherein one or more of the straps are replaced with steel bands.

In Example 14, the examples of any preceding paragraph or combination thereof further include a mesh screen wrapped around the circumference of the gasket material under the reinforcement material.

In Example 15, the examples of any preceding paragraph or combination thereof further include epoxy paste applied between the mesh screen and the reinforcement material.

In Example 16, the examples of any preceding paragraph or combination thereof further include wherein the reinforcement material is adhered to between 1 foot and 1.5 feet of the pipe beyond the gasket material on both sides.

In Example 17, the examples of any preceding paragraph or combination thereof further include wherein the gasket material includes rubber.

In Example 18, the examples of any preceding paragraph or combination thereof further include wherein the gasket material further includes a structural mesh.

Example 19 is a kit for sealing a liquid leak in a pipe. The kit includes a gasket material, straps and/or steel bands, an expandable grout, and a reinforcement material. The gasket material is material wrappable circumferentially around the pipe at a location of the leak and includes a port in the gasket material and a valve to control a flow of liquid through the port. The straps and/or steel bands are attachable around the gasket material to secure the gasket material to the pipe. The expandable grout reacts with the liquid leaking from the pipe to expand and seal the leak in the pipe. The reinforcement material is to be adhered to the gasket and the pipe to reinforce the pipe at the location of the leak.

In Example 20, the examples of any preceding paragraph or combination thereof further include a mesh screen to be wrapped around the circumference of the gasket material after the gasket material is wrapped around the pipe.

In Example 21, the examples of any preceding paragraph or combination thereof further include epoxy paste to be applied between the mesh screen and the reinforcement material.

In Example 22, the examples of any preceding paragraph or combination thereof further include wherein the gasket material includes rubber.

In Example 23, the examples of any preceding paragraph or combination thereof further include wherein the gasket material further includes a structural mesh.

In Example 24, the examples of any preceding paragraph or combination thereof further include shims installable between the gasket material and the pipe to create an annular cavity between the gasket material and the pipe.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A system for sealing a liquid leaking from a pipe, the system comprising:
    a gasket material wrapped circumferentially around the pipe at a location of the leak;
    steel bands affixed to the gasket material and positioned to secure the gasket material to the pipe;
    an expanded grout disposed with an annular cavity formed between the gasket material and the pipe that seals the leak in the pipe, wherein the expanded grout is formed by an unexpanded grout reacting with the liquid that flows through the pipe during operation and expanding;
    a mesh screen layer wrapped around a circumference of the gasket material;
    an epoxy paste layer applied to the mesh screen layer and the pipe;
    a first reinforcement material layer comprising a carbon fiber material and epoxy adhered to the epoxy paste layer and the pipe to reinforce the pipe at the location of the leak; and
    a second reinforcement material layer comprising a second carbon fiber material and epoxy adhered to the first reinforcement material layer to reinforce the pipe at the location of the leak.

2. The system of claim 1, further comprising shims installed between the gasket material and the pipe to create the annular cavity.

3. The system of claim 1, wherein at least one of the reinforcement material layers is adhered to between 1 foot and 1.5 feet of the pipe beyond the gasket material on both sides.

4. The system of claim 1, wherein the gasket material comprises rubber.

5. The system of claim 4, wherein the gasket material further comprises a structural mesh.

6. The system of claim 1, wherein at least one of the reinforcement material layers is wrapped around a circumference of the pipe at an angle of 45° with respect to a longitudinal axis of the pipe.

7. A method for sealing a pipe that is leaking a liquid, the method comprising:
    wrapping a gasket material around a circumference of the pipe at a location of a leak to create an annular cavity between the gasket material and the pipe;
    allowing at least some the liquid to exit from the annular cavity;
    securing the gasket material to the pipe via steel bands affixed to the gasket material;
    injecting an expandable grout into the annular cavity between the pipe and the gasket material;
    allowing the expandable grout to expand upon reacting with the liquid to create a seal around the leak;
    wrapping a mesh screen layer around a circumference of the gasket material;
    applying an epoxy paste layer to the mesh screen layer and the pipe;

adhering a first reinforcement material layer comprising a first carbon fiber material and epoxy to the epoxy paste layer and the pipe to reinforce the pipe at the location of the leak; and adhering a second reinforcement material layer comprising a second carbon fiber material and epoxy to the first reinforcement material layer to further reinforce the pipe at the location of the leak.

* * * * *